(12) United States Patent
Jang et al.

(10) Patent No.: US 11,486,331 B2
(45) Date of Patent: Nov. 1, 2022

(54) GAS ENGINE HEAT PUMP

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/405,279

(22) Filed: Aug. 18, 2021

(65) Prior Publication Data

US 2022/0056837 A1 Feb. 24, 2022

(30) Foreign Application Priority Data

Aug. 20, 2020 (KR) ........................ 10-2020-0104639

(51) Int. Cl.
*F02B 37/18* (2006.01)
*F02B 39/10* (2006.01)
(Continued)

(52) U.S. Cl.
CPC ............. *F02G 5/02* (2013.01); *F01N 3/0205* (2013.01); *F02B 37/18* (2013.01); *F02B 39/10* (2013.01); *F02D 41/0007* (2013.01); *F24F 1/44* (2013.01)

(58) Field of Classification Search
CPC .. F02B 35/02; F02B 39/10; F02G 5/02; F24F 1/44; F02D 41/0027; F02D 29/04; F01N 5/02
See application file for complete search history.

(56) References Cited

U.S. PATENT DOCUMENTS

| 2015/0139777 A1 | 5/2015 | Almkvist et al. |
| 2020/0173298 A1 | 6/2020 | Romagnoli et al. |
| 2022/0056829 A1* | 2/2022 | Jang ..................... F02D 19/022 |

FOREIGN PATENT DOCUMENTS

| DE | 10-2010-025196 | 12/2011 |
| DE | 10-2013-000040 | 7/2014 |

(Continued)

OTHER PUBLICATIONS

European Search Report dated Jan. 24, 2022 issued in Application No. 21192074.9.

*Primary Examiner* — Ngoc T Nguyen
(74) *Attorney, Agent, or Firm* — Ked & Associates

(57) ABSTRACT

The present disclosure relates to a gas engine heat pump including: an engine which burns a mixed air of air and fuel; a first exhaust flow path which is connected to the engine so that exhaust gas discharged from the engine passes through and is discharged to the outside; a turbo charger including: a first compressor which compresses the mixed air and supplies to the engine, and a first turbine which is installed in the first exhaust flow path and receives the exhaust gas passing through the first exhaust flow path to drive the first compressor; a supercharger which is installed in the first exhaust flow path between the engine and the first turbine, and receives and compresses the exhaust gas passing through the first exhaust flow path to supply to the first turbine; a second exhaust flow path which is branched from the first exhaust flow path between the engine and the supercharger, and converges to the first exhaust flow path between the supercharger and the first turbine; a first valve which is installed to be opened and closed in the second exhaust flow path; a third exhaust flow path which is branched from the first exhaust flow path between the supercharger and the first turbine, and converges to the first exhaust flow path in downstream of the first turbine; a (Continued)

second valve which is installed to be opened and closed in the third exhaust flow path; and a controller which controls operations of the first valve, the second valve, and the supercharger according to load of the engine.

10 Claims, 9 Drawing Sheets

(51) Int. Cl.
*F02D 41/00* (2006.01)
*F24F 1/44* (2011.01)
*F02G 5/02* (2006.01)
*F01N 3/02* (2006.01)

(56) References Cited

FOREIGN PATENT DOCUMENTS

| | | |
|---|---|---|
| EP | 2610455 | 7/2013 |
| JP | 2017-180746 | 10/2017 |
| WO | WO 2008/013157 | 1/2008 |

* cited by examiner

GAS ENGINE HEAT PUMP

This application claims priority to and benefit of Korean Patent Application No. 10-2020-0104639, filed Aug. 20, 2020, whose entire disclosures are incorporated herein by reference.

BACKGROUND OF THE INVENTION

1. Field of the Invention

The present disclosure relates to a gas engine heat pump, and more particularly, to a gas engine heat pump having improved engine output by double supercharging exhaust gas generated due to engine combustion.

2. Description of the Related Art

In general, a heat pump refers to a device that heats and cools a room through a process of compressing, condensing, expanding, and evaporating a refrigerant. When cooling a room, an indoor heat exchanger may serve as an evaporator through which a low-temperature, low-pressure refrigerant passes, and an outdoor heat exchanger may serve as a condenser through which a high-temperature and high-pressure refrigerant passes. On the other hand, when heating a room, the indoor heat exchanger may serve as a condenser, and the outdoor heat exchanger may serve as an evaporator. The heat pump may be classified into an electric heat pump (EHP) that drives a compressor using an electric motor, and a gas engine heat pump (GHP) that drives the compressor using combustion energy of fuel gas.

The gas engine heat pump includes an engine that generates power using a mixture (hereinafter, a mixed air) of fuel and air. For example, the engine may include an engine cylinder to which the mixed air is supplied, and a piston provided to be movable within the cylinder.

The gas engine heat pump may include an air supply device for supplying air and fuel, a fuel supply device, and a mixer for mixing the air and fuel.

The air supply device may include an air filter for purifying air. In addition, the fuel supply device may include a zero governor for supplying fuel at a constant pressure. The air that has passed through the air filter and the fuel discharged from the zero governor may be mixed (mixed air) in the mixer, and supplied to the engine.

Meanwhile, the mixed air passed through the mixer may be supplied to the engine through a supercharging action by a supercharging device. The supercharging device typically includes a supercharger and a turbocharger.

The mixed air flowed into the engine through the supercharging device passes through an intake manifold and is supplied to each of a plurality of engine cylinders formed in the engine. In addition, the mixed air may cause a combustion reaction inside the plurality of engine cylinders, and thermal energy generated according to the combustion reaction may be converted into mechanical energy to drive the compressor.

Exhaust gas generated according to the combustion reaction of the mixed air in the engine may pass through an exhaust manifold, be cooled by cooling water through an exhaust gas heat exchanger, and then be discharged to the outside of the gas engine heat pump through a muffler.

Meanwhile, in recent years, as well as a technique for precisely adjusting the output of the engine, a technique for improving the output of the engine is also required because the load required for the engine is gradually increased frequently.

SUMMARY OF THE INVENTION

The present disclosure provides a gas engine heat pump including a structure capable of further improving an output of engine.

The present disclosure further provides a gas engine heat pump capable of more precisely adjusting an output of engine stepwise.

A gas engine heat pump according to an embodiment of the present disclosure includes: an engine which burns a mixed air of air and fuel; a first exhaust flow path which is connected to the engine so that exhaust gas discharged from the engine passes through and is discharged to the outside; a turbo charger including: a first compressor which compresses the mixed air and supplies to the engine, and a first turbine which is installed in the first exhaust flow path and receives the exhaust gas passing through the first exhaust flow path to drive the first compressor; a supercharger which is installed in the first exhaust flow path between the engine and the first turbine, and receives and compresses the exhaust gas passing through the first exhaust flow path to supply to the first turbine; a second exhaust flow path which is branched from the first exhaust flow path between the engine and the supercharger, and converges to the first exhaust flow path between the supercharger and the first turbine; a first valve which is installed to be opened and closed in the second exhaust flow path; a third exhaust flow path which is branched from the first exhaust flow path between the supercharger and the first turbine, and converges to the first exhaust flow path in downstream of the first turbine; a second valve which is installed to be opened and closed in the third exhaust flow path; and a controller which controls operations of the first valve, the second valve, and the supercharger according to load of the engine.

The controller opens the first valve and the second valve, when load condition of the engine has a value ranging within a first load condition or a second load condition.

The controller fully opens the second valve, when the load condition of the engine has a value ranging within the first load condition, and adjusts an opening rate of the second valve according to the load of the engine, while opening the first valve and the second valve, when the load condition of the engine has a value ranging within the second load condition.

The controller opens the first valve and closes the second valve, when the load condition of the engine has a value ranging within a third load condition.

The controller drives the supercharger, when the load condition of the engine has a value ranging within a fourth load condition or a fifth load condition.

The controller closes the first valve, when the load condition of the engine has a value ranging within the fourth load condition or the fifth load condition.

The controller adjusts an opening rate of the second valve according to the load of the engine, while opening the second valve, when the load condition of the engine has a value ranging within the fourth load condition.

The controller closes the second valve, when the load condition of the engine has a value ranging within the fifth load condition.

The gas engine heat pump further includes an exhaust gas heat exchanger installed in the first exhaust flow path to cool the exhaust gas discharged from the engine.

The exhaust gas heat exchanger is installed in downstream of the first turbine.

The details of embodiments are included in the detailed description and drawings.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
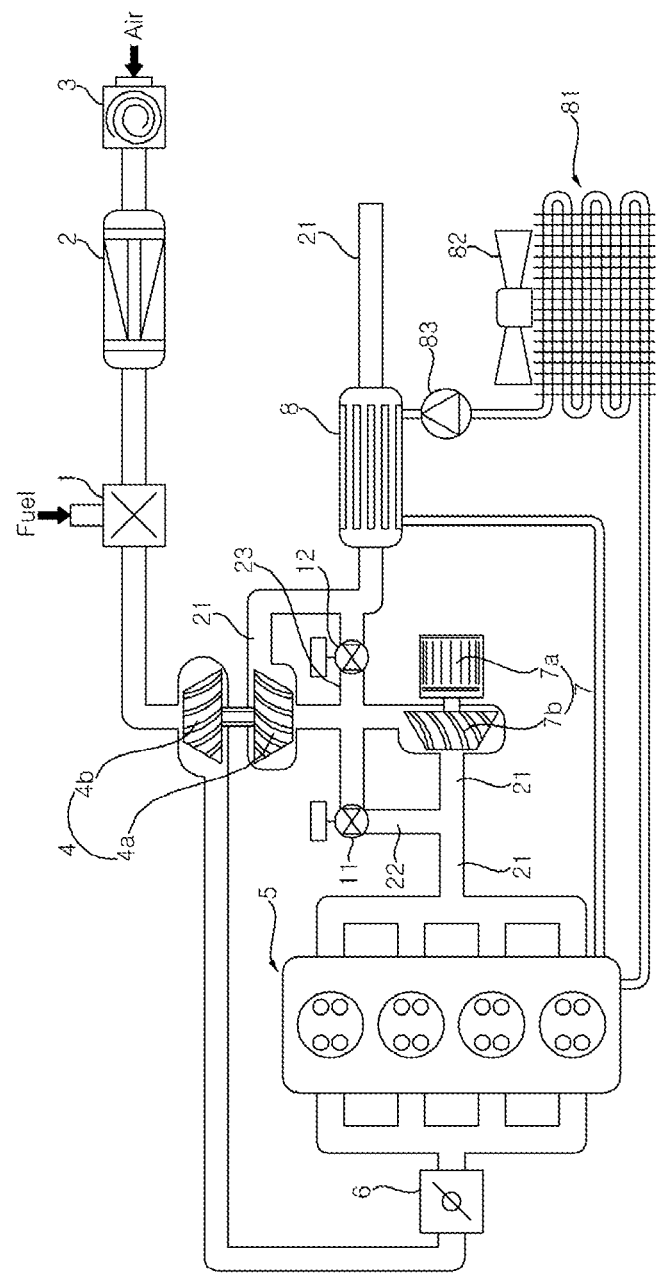
FIG. 1 is a schematic diagram of a gas engine heat pump system according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

The terms spatially relative, "below", "beneath", "lower", "above" and "upper" and the like can be used to easily describe the correlation of elements with other elements. Spatially relative terms should be understood in terms of the directions shown in the drawings, including the different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

The terminology used herein is for the purpose of illustrating embodiments and is not intended to restrict the invention. In this specification, singular forms include plural forms unless the context clearly dictates otherwise. It is noted that the terms "comprises" and/or "comprising" used in the specification mean that mentioned elements, steps, and/or operations do not exclude the presence or addition of one or more of other elements, steps, and/or operations.

Unless defined otherwise, all terms (including technical and scientific terms) used herein may be used in a sense commonly understood by a person having ordinary skill in the art to which the claimed invention pertains. In addition, commonly used predefined terms are not ideally or excessively interpreted unless explicitly defined otherwise.

In the drawings, the thicknesses and sizes of respective elements are exaggerated, omitted, or schematically shown for convenience and clarity of explanation. In addition, the size and area of each element do not entirely reflect actual size or area.

Hereinafter, the present disclosure will be described with reference to the drawings for explaining a gas engine heat pump of the present disclosure according to embodiments of the present disclosure.

Hereinafter, referring to FIG. 1, the gas engine heat pump according to the present disclosure includes an engine 5 for driving a compressor (not shown) by burning a mixed air of air and fuel.

The fuel and air may be supplied through a fuel supply device and an air supply device, respectively. In addition, the supplied fuel and air may be mixed to be a mixed air through a mixer 1.

The air supply device may include an air filter 2 for purifying air. In addition, the air supply device may include a silencer 3 for reducing noise caused by the inflow of air. In addition, the fuel supply device may include a zero governor (not shown) for supplying fuel at a constant pressure.

Meanwhile, the gas engine heat pump of the present disclosure includes a turbo charger 4 for compressing the exhausted mixed air which is mixed after air and fuel are mixed in the mixed air 1 and supplying to the engine 5. The turbo charger 4 may compress the air and fuel to atmospheric pressure or higher in the mixer 1 by adjusting a rotation speed.

The turbo charger 4 may include a first compressor 4b that compresses the mixed air and introduces the compressed mixed air into the engine 5, and a first turbine 4a that receives the exhaust gas discharged from the engine 5 to drive the first compressor 4b. The first compressor 4b may be disposed in the upstream side of the engine 5 and may be connected to an intake side of the engine 5. In addition, the first turbine 4a may be disposed in the downstream side of the engine 5 to receive exhaust gas from the engine 5.

Meanwhile, the gas engine heat pump may include a control means 6. For example, the control means 6 may be provided as a valve to which an electronic throttle control (ETC) method is applied. Fuel and air are mixed in the mixer 1, and may be pressurized at a high pressure in the turbo charger 4 which is a supercharging means. Then, as the opening degree of the control means 6 is adjusted, the amount of the mixed air may be adjusted and supplied to the engine 5.

Meanwhile, an exhaust flow path connected to the downstream of the engine 5 may be branched into a plurality flow paths, and thus, the exhaust gas discharged from the engine 5 may be branched and flow into the plurality of flow paths.

Specifically, the gas engine heat pump of the present disclosure may include a first exhaust flow path 21 which is connected to the engine 5 so that the exhaust gas discharged from the engine passes through and is discharged to the outside. In addition, the gas engine heat pump may include a second exhaust flow path 22 and a third exhaust flow path 23 which are a bypass flow path branched from the first exhaust flow path 21.

Meanwhile, the gas engine heat pump of the present disclosure includes a supercharger 7 that receives exhaust gas discharged from the engine, compresses, and supplies the exhaust gas to the first turbine 4a of the turbocharger 4. The supercharger 7 may include a second compressor 7b for receiving and compressing exhaust gas and a motor 7a for driving the compressor 7b.

The first turbine 4a of the turbocharger 4 may be installed in the first exhaust flow path 21, and may receive exhaust gas which is discharged from the engine 5 and passes through the first exhaust flow path 21 and drive the first compressor 4b.

In addition, the supercharger 7 may be installed in the first exhaust flow path 21 to compress and supply exhaust gas to the first turbine 4a. Specifically, the second compressor 7b of the supercharger 7 may be installed in the first exhaust flow path 21 between the engine 5 and the first turbine 4a, and the second compressor 7b may receive the exhaust gas passing through the first exhaust flow path 21, and compress and supply the exhaust gas to the first turbine 4a.

That is, the first exhaust flow path 21 may be connected to the exhaust side of the engine 5 and may discharge the exhaust gas discharged from the engine 5 to the outside. In addition, the supercharger 7 and the first turbine 4a may be sequentially installed inside the first exhaust flow path 21.

Meanwhile, the second exhaust flow path 22 may be branched from the first exhaust flow path 21 between the engine 5 and the supercharger 7, and may be converged again to the first exhaust flow path 21 between the supercharger 7 and the first turbine 4a. In this case, the first valve 11 may be installed to be opened and closed in the second exhaust flow path 22.

In addition, the third exhaust flow path 23 may be branched from the first exhaust flow path 21 between the supercharger 7 and the first turbine 4a, and may be converged again to the first exhaust flow path 21 in downstream of the first turbine 4a. In this case, the second valve 12 may be installed to be opened and closed in the third exhaust flow path 23.

Meanwhile, the controller 30 (see FIG. 2) may control the operations of the first valve 11, the second valve 12, and the supercharger 7 according to the load of the engine 5. In this case, the controller 30 may control the first valve 11 and the second valve 12 to be opened or closed and adjust the opening degree of the first valve 11 and the second valve 12. Further, in the supercharger 7, the controller 30 may control the motor 7a and the compressor 7b to be driven and adjust the rotation speed of the motor 7a. A detailed description of control will be described later.

The temperature of the mixed air flowing into the engine 5 is affected by the heat generated by the rotation of the supercharging device as well as the pressure of the mixed air. Assuming that a mixed air of the same pressure flows into the engine, since the present disclosure double-supercharges the exhaust side, the effect of heat from the supercharging device is less than that in the case of double-supercharging the intake side, so that the temperature of the mixed air flowing into the engine may be relatively lowered, and elimination of a configuration of intercooler (not shown) that cools the mixed air may be considered.

Meanwhile, the gas engine heat pump of the present disclosure may include an exhaust gas heat exchanger 8 for cooling the exhaust gas discharged from the engine 5. In the exhaust gas heat exchanger 8, cooling water exchanging heat with the exhaust gas may flow. Exhaust gas may be discharged to the outside while being cooled through the exhaust gas heat exchanger 8. In order to reduce noise when exhaust gas is discharged to the outside, the gas engine heat pump may further include a muffler (not shown).

The cooling water may exchange heat with the refrigerant circulating in an outdoor heat exchanger 81 while passing through the outdoor heat exchanger 81, and may be supplied into the exhaust gas heat exchanger 8 by a cooling water pump 83. The outdoor heat exchanger 81 side may be provided with a blower fan 82 for flowing air so that the heat of the outdoor heat exchanger 81 is discharged to the outside. The cooling water that passed through the exhaust gas heat exchanger 8 passes through the engine 5 and then is circulated back to the outdoor heat exchanger 81, thereby lowering the heat of the engine 5.

Meanwhile, when the exhaust gas is cooled before passing through the supercharger 7 and the first turbine 4a, the kinetic energy of the exhaust gas particles is reduced, so that the driving efficiency of turbocharger 4 may be reduced. Therefore, in order to prevent this, the exhaust gas heat exchanger 8 may be installed in downstream of the first turbine 4a.

Figure 2:
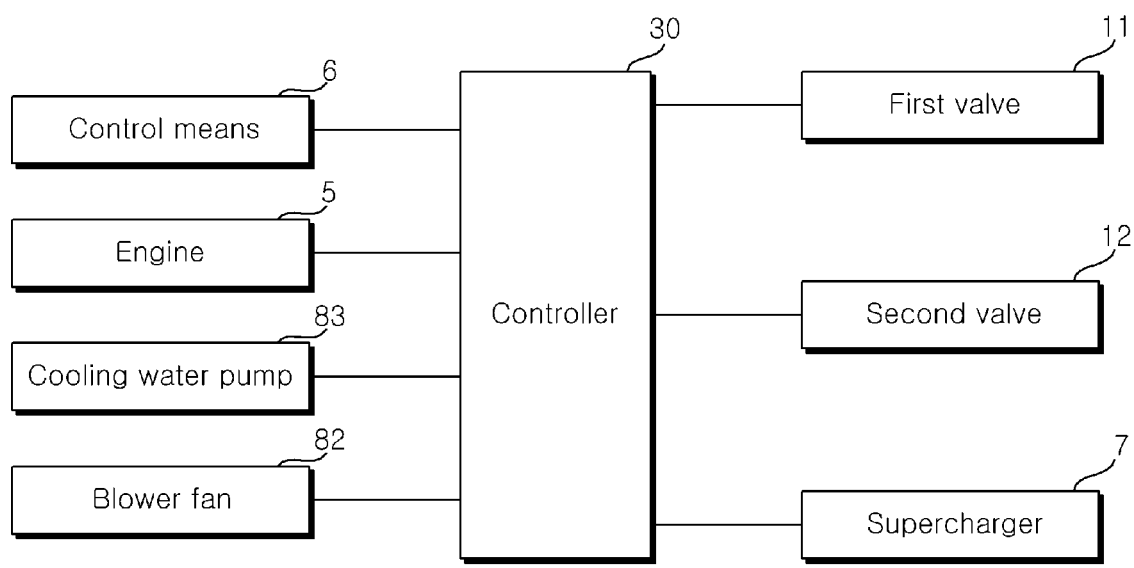
FIG. 2 is a block diagram of a control configuration of a gas engine heat pump of the present disclosure.

Hereinafter, referring to FIG. 2, the controller 30 may be connected to at least one of an engine 5, a control means 6, a cooling water pump 83, a blower fan 82, a first valve 11, a second valve 12, and a supercharger 7 to control the operation of the connected component.

The controller 30 may be connected to the motor 7a of the supercharger 7 to adjust the rotation speed of the second compressor 7b of the supercharger 7. Accordingly, the controller 30 may control the compression amount of the exhaust gas supplied to the first turbine 4a.

The controller 30 may be connected to the first valve 11 to adjust the opening degree of the first valve 11. Accordingly, the controller 30 may adjust the rotation speed of the first turbine 4a by flowing the exhaust gas only in the first exhaust flow path 21, or by adjusting the amount of exhaust gas flowing into the second exhaust flow path 22.

The controller 30 may be connected to the second valve 12 to adjust the opening degree of the second valve 12. Accordingly, the controller 30 may adjust the rotation speed of the first turbine 4a by adjusting the amount of exhaust gas flowing into the third exhaust flow path 23.

The controller 30 may adjust the opening degree of the adjusting means 6. The amount of the high-pressure mixed air supplied to the engine 5 through the control means 6 can be precisely controlled by the controller 30.

The controller 30 may receive information related to the current output and the required output of the engine 5 from the engine 5. To this end, the controller 30 may be connected to an internal configuration of the engine 5, and the engine 5 may include a sensor (not shown) therein.

The controller 30 may be connected to the cooling water pump 83 to circulate the cooling water. In addition, the controller 30 is connected to a motor (not shown) that operates the blower fan 82 and rotates the blower fan 82, so that the air in the outdoor heat exchanger 81 side flows and heat is discharged to the outside.

Figure 3:
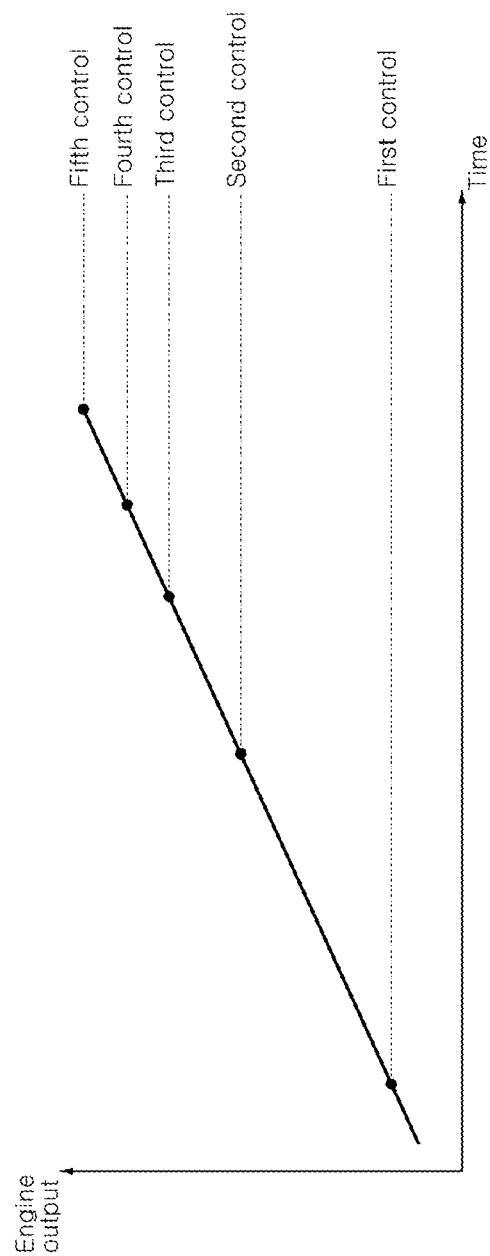
FIG. 3 is a schematic diagram illustrating an increase in engine output through a stepwise control according to increase of an engine load of a gas engine heat pump of the present disclosure.

Hereinafter, referring to FIGS. 3 and 4, in the gas engine heat pump of the present disclosure, the operation of the first valve 11, the second valve 12, and the supercharger 7 is controlled by the controller 30 according to the load of the engine, thereby increasing or decreasing the output of the engine 5. First, after the engine is driven (S10), for example, the controller 30 may implement a five-step control according to the load of the engine 5.

Hereinafter, the load condition of the engine 5 is defined. Assuming that reference value for dividing the load condition of the engine 5 is X1, X2, X3, and X4, the magnitude of the reference values has a relationship of X1<x2<x3<x4. The reference value X1, X2, X3, and X4 may have an arbitrary value. For example, based on 100% engine load, the value of X1, X2, X3, and X4 may have value of 20%, 40%, 60%, and 80%, respectively.

In this case, a first load condition may be defined as a case where the engine load is less than X1. A second load condition may be defined as a case where the engine load is greater than or equal to X1 and less than X2. A third load condition may be defined as a case where the engine load is greater than or equal to X2 and less than X3. A fourth load condition may be defined as a case where the engine load is greater than or equal to X3 and less than X4. A fifth load condition may be defined as a case where the engine load is greater than or equal to X4. That is, the first load condition is the lowest load condition among the load conditions of the engine 95, and as the first load condition goes from the first load condition to the fifth load condition, the load condition of the engine may gradually move toward a high load condition.

After the engine 5 is driven (S21), the controller 30 may determine whether the load condition of the engine 5 has a value ranging within a specific load condition among the first to fifth load conditions. FIG. 4 shows a control flowchart that, when the load condition of the engine 5 does not have a value ranging within the first load condition (No at S21), it is determined whether the load condition of the engine 5 has a value ranging within the second load condition (S22), when the load condition of the engine 5 does not have a value ranging within the second load condition (No at S22), it is determined whether the load condition of the engine 5 has a value ranging within the third load condition (S23), when the load condition of the engine 5 does not have a value ranging within the third load condition (No at S23), it is determined whether the load condition of the engine 5 has a value ranging within the fourth load condition (S24), and when the load condition of the engine 5 does not have a value ranging within the fourth load condition (No at S24), it is determined that the load condition of the engine 5 has a value ranging within the fifth load condition. However, this is just an example, and it is obvious that the controller 30 does not need to sequentially determine the load condition of the engine 5 corresponds to which load condition among the first to fifth load conditions, but can determine by a single path.

Hereinafter, the control according to load conditions of each engine will be described with reference to any one of FIGS. 5 to 9 and FIG. 4.

Figure 4:
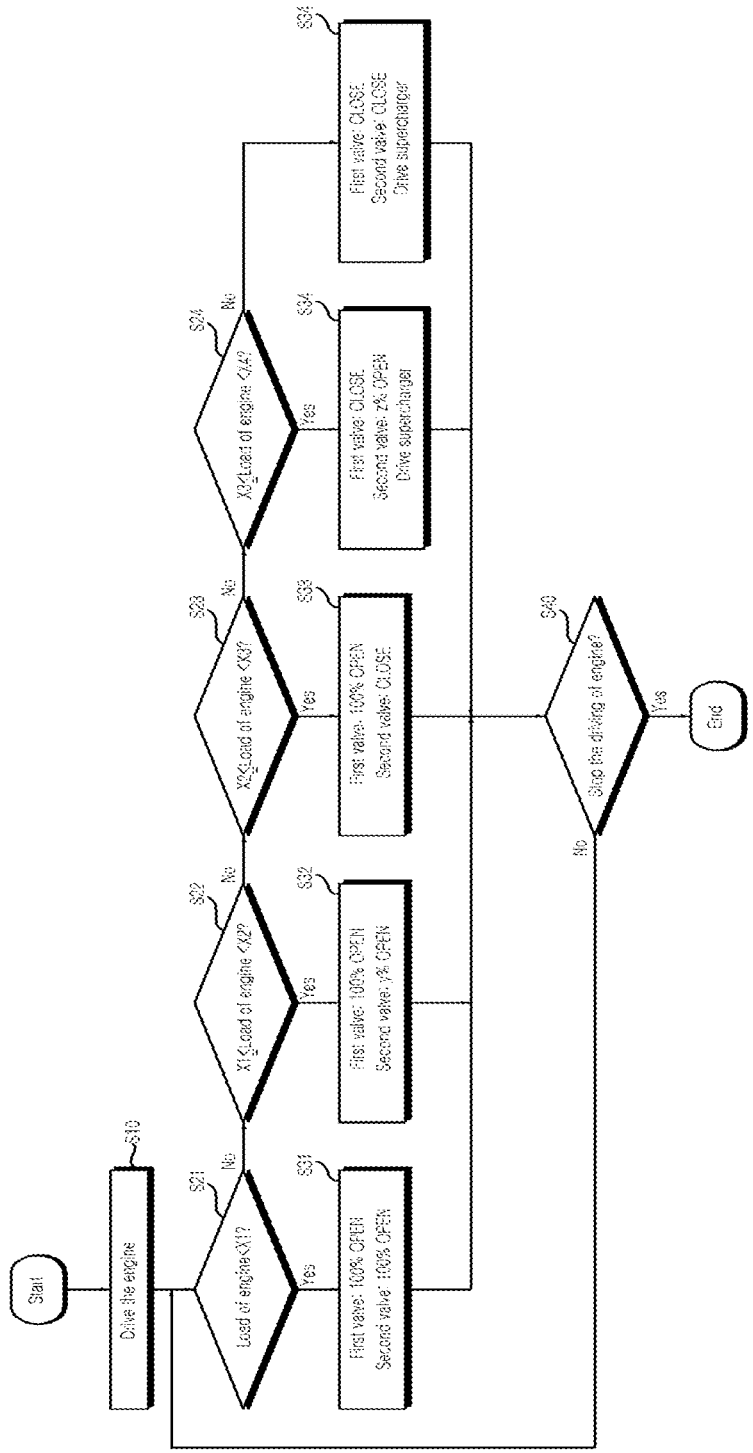
FIG. 4 is a control flowchart for a gas engine heat pump of the present disclosure.
Figure 5:
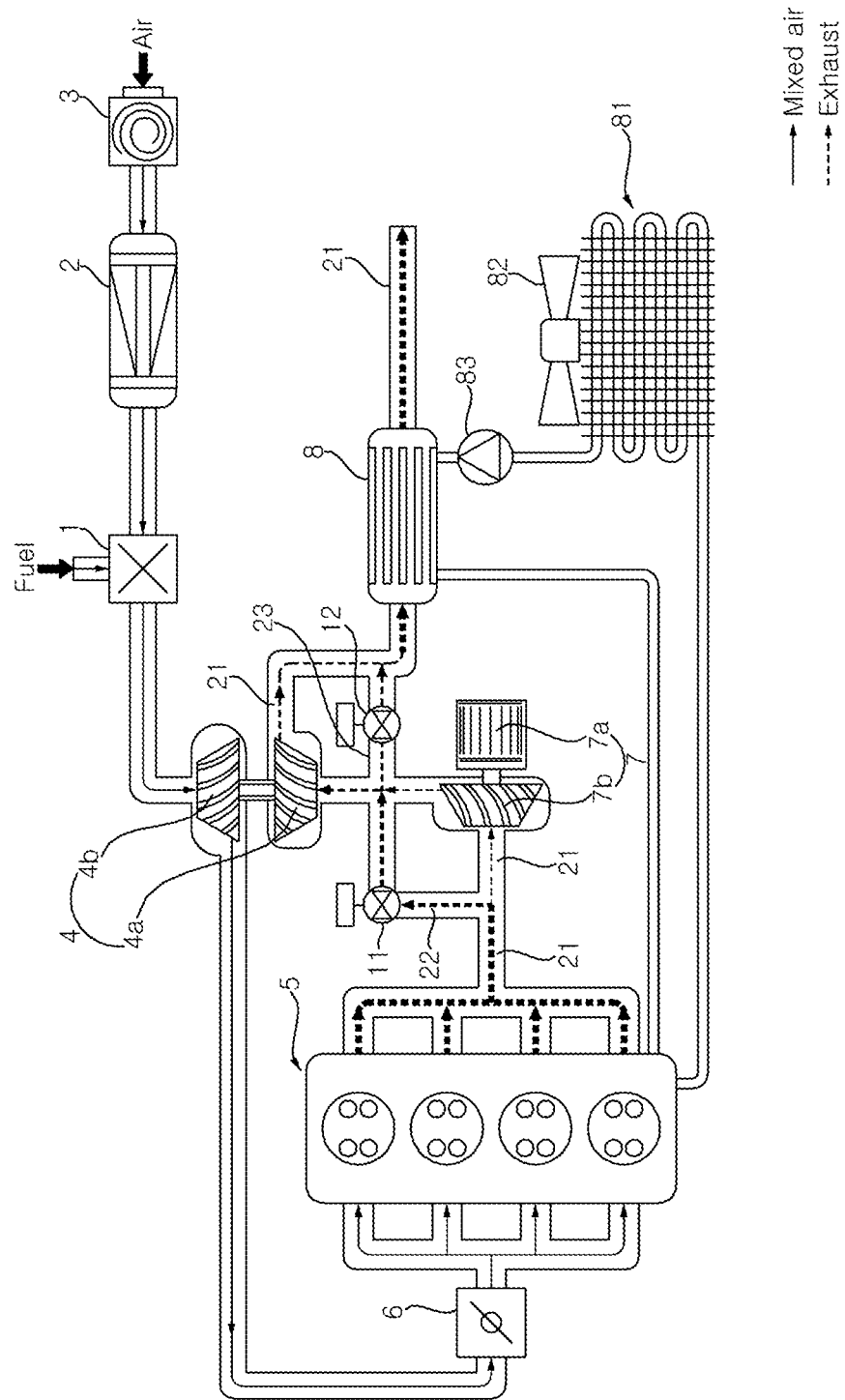
FIG. 5 is a schematic diagram of a gas engine heat pump according to an embodiment of the present disclosure.

Referring to FIGS. 4 and 5, when the load condition of the engine 5 has a value ranging within the first load condition (Yes at S21), the controller 30 may open the first valve 11 and the second valve 12 (S31). Thereafter, when the driving of the engine 5 is stopped, it is terminated (Yes at S40), and if not terminated, it can be determined again whether the load condition of the engine 5 has a value ranging within the first load condition (No at S40).

More specifically, in the first load condition which is the lowest load condition, the second valve 12 may be fully opened. At this time, the exhaust gas which is discharged from the engine 5 and passed through the first exhaust flow path 21 is branched into the second exhaust flow path 22, and is divided to flow into the first exhaust flow path 21 and the second exhaust flow path 22. Thereafter, the exhaust gas is converged again to the first exhaust flow path 21, and then branched from the first exhaust flow path 21 to the third exhaust flow path 23, and is divided to flow into the first exhaust flow path 21 and the third exhaust flow path 23.

At this time, since the supercharger 7 is not driven, if the first valve 11 is closed, there may be a large resistance to the flow of exhaust gas. Accordingly, when the first valve 11 is opened, at this time, the amount of exhaust gas passing through the first valve 11 may be greater than that of the exhaust gas passing through the supercharger. The first valve 11 may also be fully open.

The exhaust gas passing through the first exhaust flow path 21 and the second exhaust flow path 22 is converted to the first exhaust flow path 21, and then branched into the first exhaust flow path 21 and the third exhaust flow path 23 by the fully opened second valve 12 to pass through the first turbine 4a. Accordingly, it is possible to supercharge the turbocharger 4 by rotating the turbocharger 4 so as to be suitable for the lowest load condition.

Figure 6:
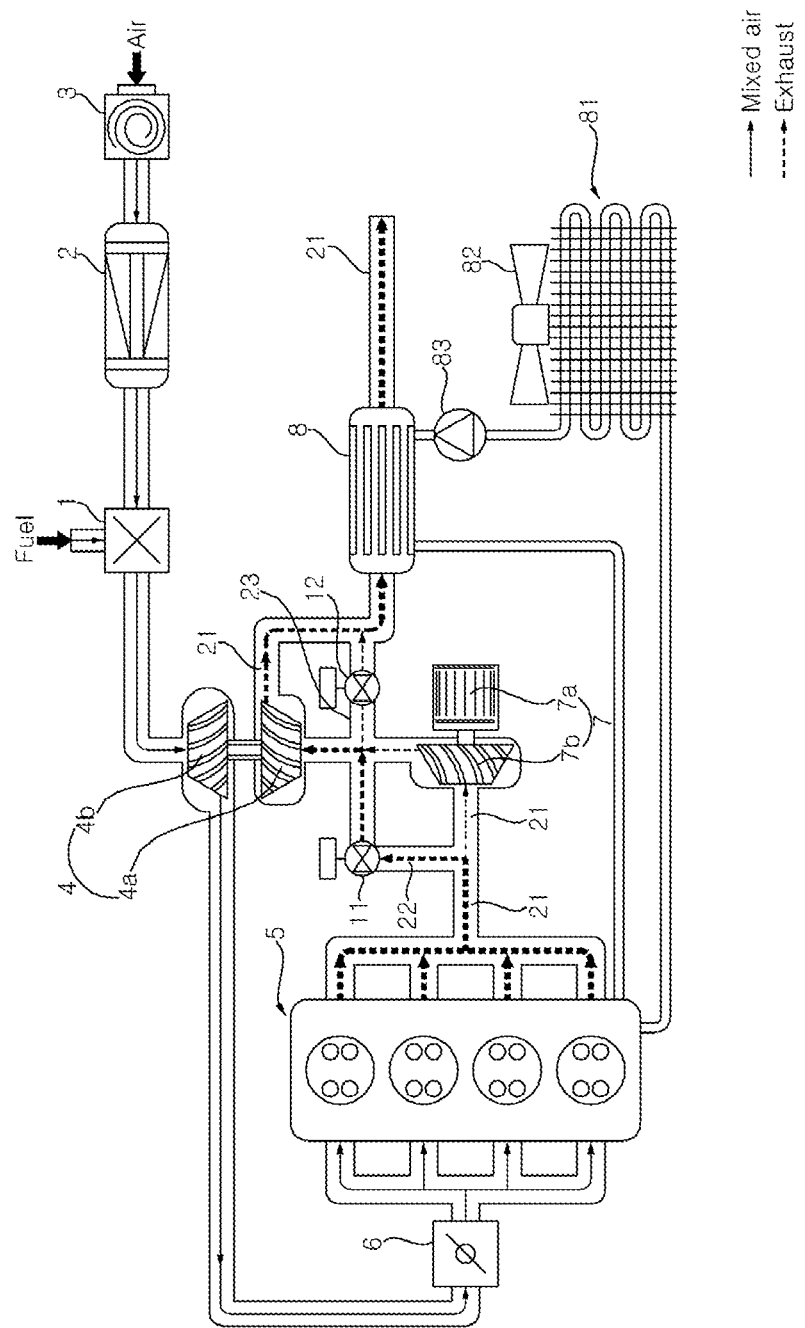
FIG. 6 is a schematic diagram of a gas engine heat pump according to another embodiment of the present disclosure.

Referring to FIGS. 4 and 6, when the load condition of the engine 5 has a value ranging within the second load condition (Yes at S22), the controller 30 may open the first valve 11 and the second valve 12 (S31). In this case, the controller 30 may open the second valve 12 by an opening rate of y % according to the load of the engine 5. At this time, since the flow rate of the exhaust gas supplied to the first turbine 4a can be determined according to the opening rate of the second valve 12, the controller 30 may adjust a value y according to the load condition of the engine 5, within the second load condition. In addition, the first valve 11 may be fully opened.

Since the amount of exhaust gas supplied to the first turbine 4a is greater than in a case where the second valve 12 is fully opened. The turbocharger 4 may be rotated to be supercharged to be suitable for the second load condition having a higher load condition than the first load condition.

Figure 7:
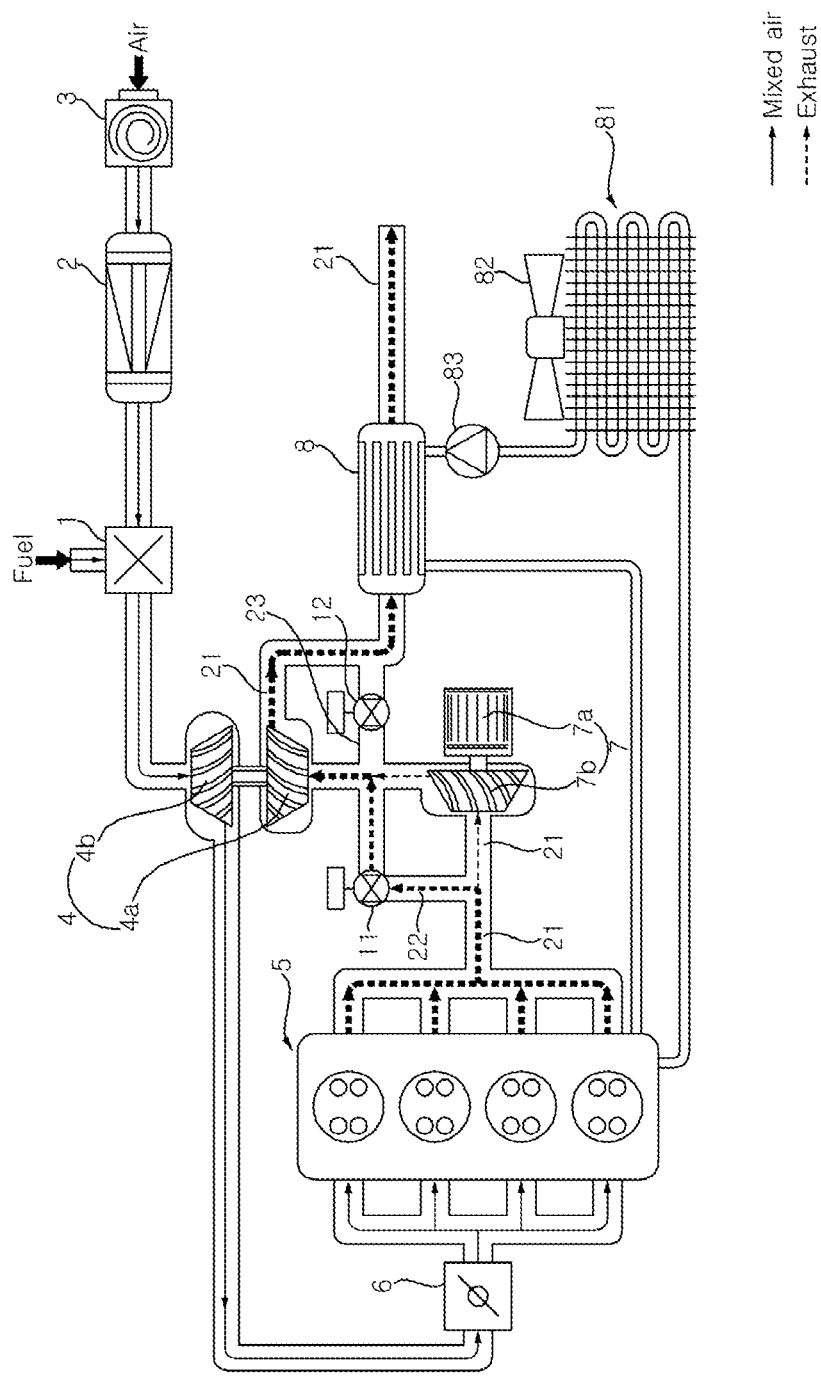
FIG. 7 is a schematic diagram of a gas engine heat pump according to another embodiment of the present disclosure.

Referring to FIGS. 4 and 7, when the load condition of the engine has a value ranging within the third load condition (Yes at S23), the controller 30 may open the first valve 11 and close the second valve 12. At this time, the first valve 11 may be fully opened.

In this case, since the second valve 12 is closed, the exhaust gas may not be branched into the third exhaust flow path 23 and may be supplied to the first turbine 4a through the first exhaust flow path 21. That is, the entire amount of exhaust gas discharged from the engine 5 may be supplied to the first turbine 4a, so that the turbocharger 4 may be rotated to be supercharged to be suitable for the third load condition having a higher load condition than the second load condition.

Figure 8:
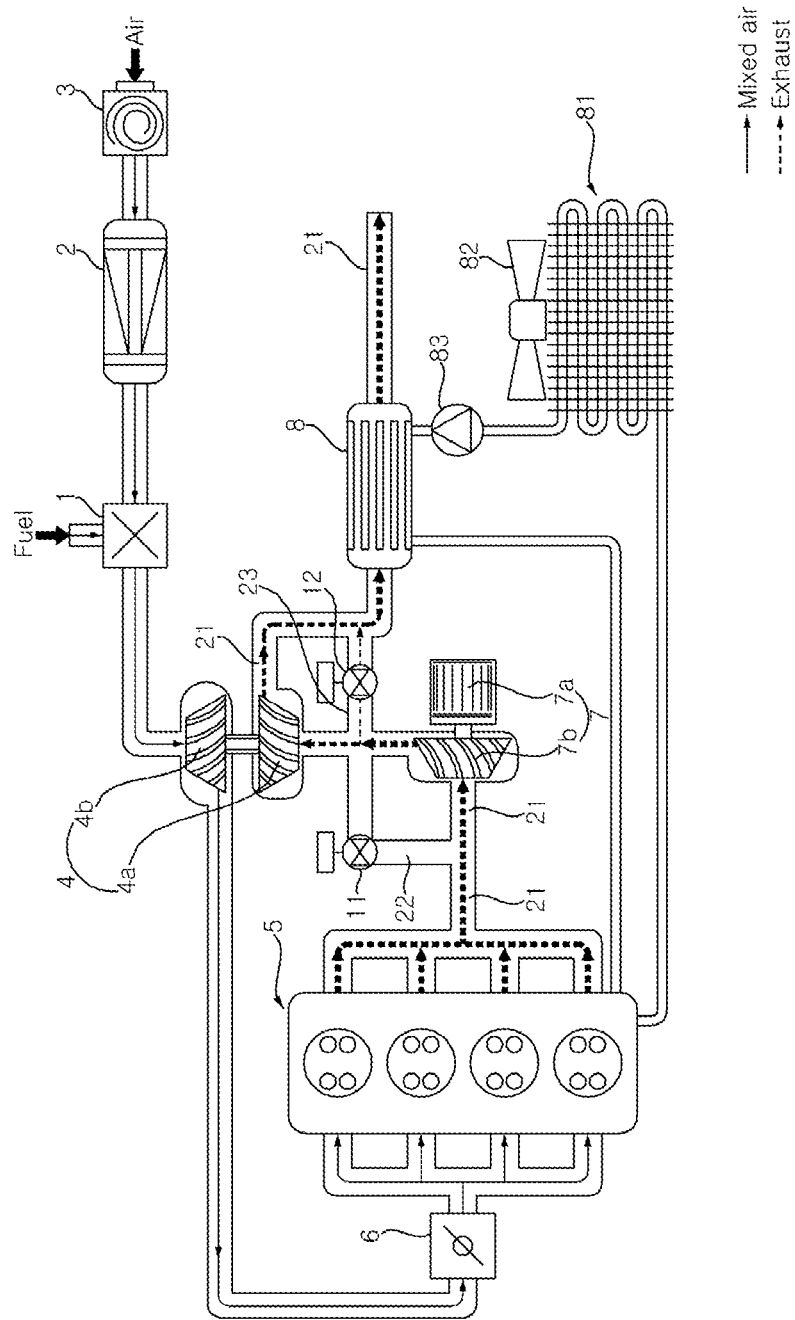
FIG. 8 is a schematic diagram of a gas engine heat pump according to another embodiment of the present disclosure.

Referring to FIGS. 4 and 8, when the load condition of the engine 5 has a value ranging within the fourth load condition (Yes at S24), the controller 30 may drive the supercharger 7. Accordingly, the supercharger 7 may compress the exhaust gas discharged from the engine 5 to supply to the first turbine 4a, and the supercharging function of the turbocharger 4 and the output of the engine 5 may be improved. In this case, the controller 30 may control the amount of supercharging the exhaust gas to the first turbine 4a by adjusting the rotation speed of the supercharger 7.

In this case, the controller 30 may close the first valve 11. Accordingly, the exhaust gas discharged from the engine 5 is not branched into the second exhaust flow path 22, and the entire amount passes through the supercharger 7 to be supercharged to the first turbine 4a.

In addition, the controller 30 may open the second valve 12. In this case, the controller 30 may adjust the opening rate of the second valve 12 to z % according to the load of the engine 5. At this time, since the flow rate of the exhaust gas supplied to the first turbine 4a can be determined according to the opening rate of the second valve 12, the controller 30 may adjust the z value according to the load condition of the engine 5 within the second load condition.

Figure 9:
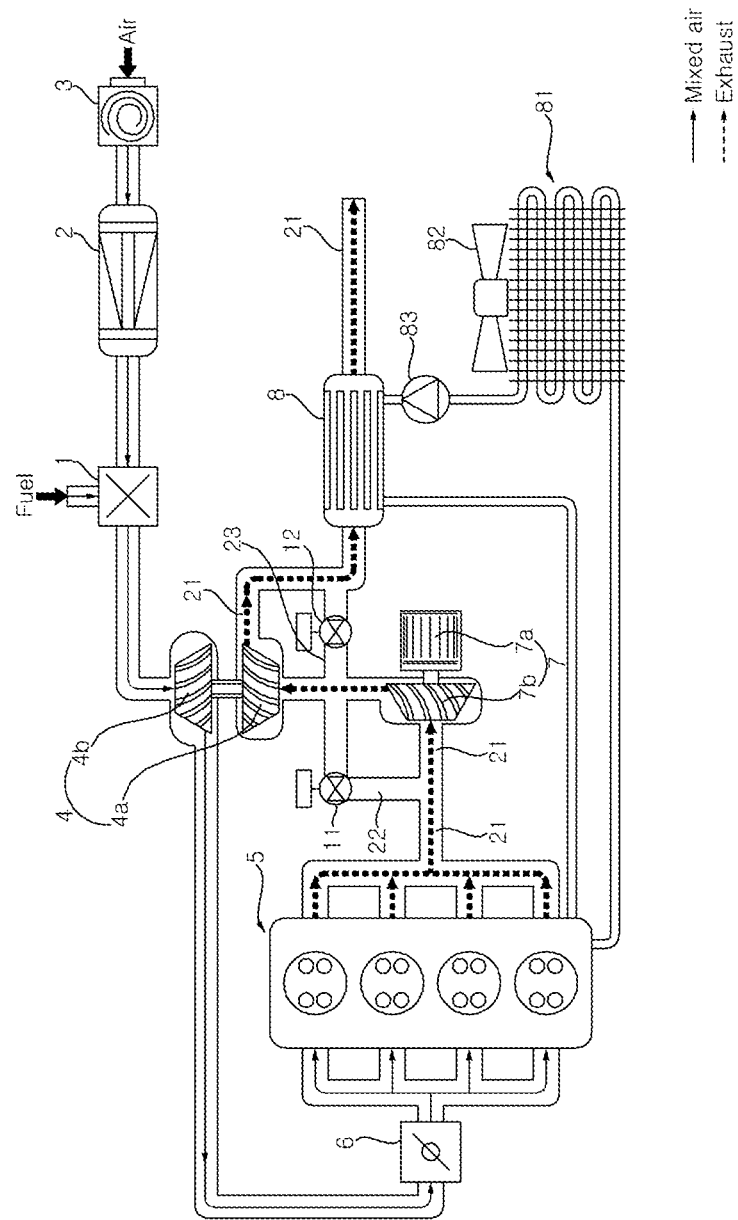
FIG. 9 is a schematic diagram of a gas engine heat pump according to another embodiment of the present disclosure.

Referring to FIGS. 4 and 9, if the load condition of the engine 5 does not have a value ranging within the fourth load condition (No at S24), the load condition of the engine has a value ranging within the fifth load condition, and in this case, the controller 30 may close both the first valve 11 and the second valve 12. That is, since the second valve 12 is not opened in relation to the fourth load condition, the entire amount of exhaust gas discharged from the engine 5 can be supplied to the first turbine 4a through the driven supercharger 7.

According to the gas engine heat pump of the present disclosure, there are one or more of the following effects.

First, since the supercharger can compress and supply the exhaust gas discharged from the engine to the turbine of the turbocharger, the output of the engine can be further improved.

Second, since it is possible to control the operations of the first valve, the second valve, and the supercharger according to the load of the engine, the output of the engine can be more precisely controlled.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and variations should not be understood individually from the technical idea or aspect of the present disclosure.

What is claimed is:

1. A gas engine heat pump comprising:
   an engine which burns a mixed air of air and fuel;
   a first exhaust flow path which is connected to the engine so that exhaust gas discharged from the engine passes through and is discharged to the outside;
   a turbo charger comprising: a first compressor which compresses the mixed air and supplies to the engine, and a first turbine which is installed in the first exhaust flow path and receives the exhaust gas passing through the first exhaust flow path to drive the first compressor;
   a supercharger which is installed in the first exhaust flow path between the engine and the first turbine, and receives and compresses the exhaust gas passing through the first exhaust flow path to supply to the first turbine;
   a second exhaust flow path which is branched from the first exhaust flow path between the engine and the supercharger, and converges to the first exhaust flow path between the supercharger and the first turbine;
   a first valve which is installed to be opened and closed in the second exhaust flow path;
   a third exhaust flow path which is branched from the first exhaust flow path between the supercharger and the first turbine, and converges to the first exhaust flow path in downstream of the first turbine;
   a second valve which is installed to be opened and closed in the third exhaust flow path; and
   a controller which controls operations of the first valve, the second valve, and the supercharger according to load of the engine.

2. The gas engine heat pump of claim 1, wherein the controller opens the first valve and the second valve, when load condition of the engine has a value ranging within a first load condition or a second load condition.

3. The gas engine heat pump of claim 2, wherein the controller fully opens the second valve, when the load condition of the engine has a value ranging within the first load condition, and
   adjusts an opening rate of the second valve according to the load of the engine, while opening the first valve and the second valve, when the load condition of the engine has a value ranging within the second load condition.

4. The gas engine heat pump of claim 1, wherein the controller opens the first valve and closes the second valve, when the load condition of the engine has a value ranging within a third load condition.

5. The gas engine heat pump of claim 1, wherein the controller drives the supercharger, when the load condition of the engine has a value ranging within a fourth load condition or a fifth load condition.

6. The gas engine heat pump of claim 5, wherein the controller closes the first valve, when the load condition of the engine has a value ranging within the fourth load condition or the fifth load condition.

7. The gas engine heat pump of claim 6, wherein the controller adjusts an opening rate of the second valve according to the load of the engine, while opening the second valve, when the load condition of the engine has a value ranging within the fourth load condition.

8. The gas engine heat pump of claim 6, wherein the controller closes the second valve, when the load condition of the engine has a value ranging within the fifth load condition.

9. The gas engine heat pump of claim 6, further comprising an exhaust gas heat exchanger installed in the first exhaust flow path to cool the exhaust gas discharged from the engine.

10. The gas engine heat pump of claim 9, wherein the exhaust gas heat exchanger is installed in downstream of the first turbine.

* * * * *